Jan. 17, 1956  C. W. CHILLSON  2,730,908
WORM DRIVE MECHANISM

Original Filed June 8, 1946  4 Sheets-Sheet 3

INVENTOR
Charles W. Chillson
BY
Godfrey D. Spear
Attorney

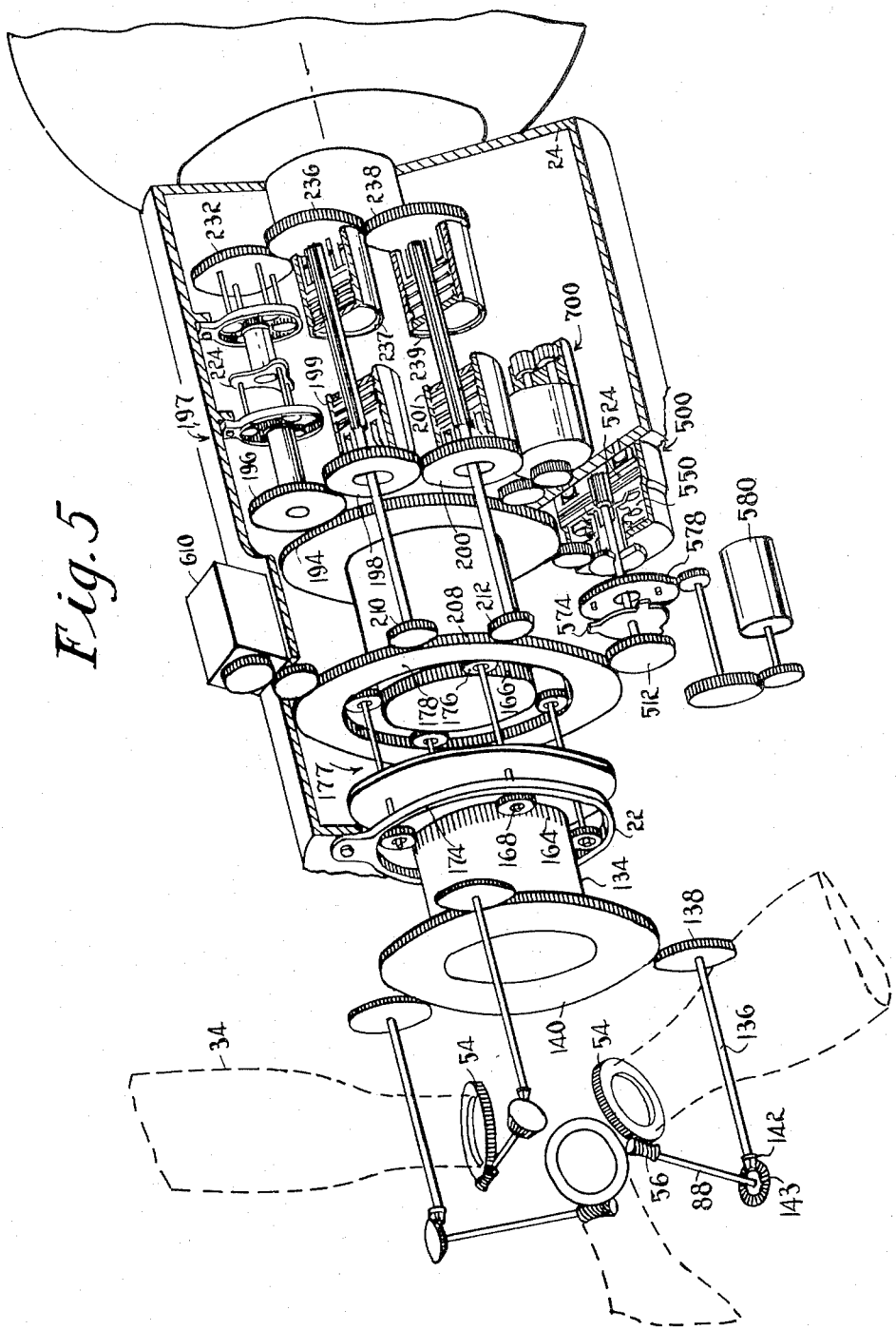

United States Patent Office 2,730,908
Patented Jan. 17, 1956

2,730,908

WORM DRIVE MECHANISM

Charles W. Chillson, Caldwell, N. J., assignor to Curtiss-Wright Corporation, a corporation of Delaware Application November 12, 1952, Serial No. 320,046

3 Claims. (Cl. 74—425)

This invention relates to variable pitch propellers, and more particularly to such propellers wherein power for effecting changes of blade pitch is primarily derived from the propeller drive shaft, and is a division of Patent Application Serial No. 675,383, filed June 8, 1946 (now Patent No. 2,640,552, issued June 2, 1953).

In variable pitch propellers, it has become desirable to increase the speed with which changes in pitch may be effected. This is particularly true where reverse pitch is to be employed for reducing the speed of an aircraft as when landing or during other maneuvers. Also, it is desirable to feather a propeller rapidly. The speed with which such pitch changes can be made depends on the forces to be overcome, such as the centrifugal blade twisting moment, the inertia of the parts, the friction and the power available to effect the change.

It is accordingly an object of the present invention to provide a pitch changing mechanism drivably from the propeller shaft, whereby high torque is instantly available and wherein advantage may be taken of relatively low rotational speed of the several parts by arranging the pitch changing structure so that it is subject to low stresses and low inertia loads. This enables construction of the mechanism with parts of light weight.

Another object of the invention relates to providing a pitch changing mechanism of the foregoing high torque type wherein pitch changing may be effected at a fast rate for maneuvering, or a slow rate for regulating the speed of rotation of the prime mover, the regulation being improved by the substantially instantaneous initiation and termination of changes in pitch.

Still another object of the invention is to provide a rugged light compact mechanism capable of effecting pitch changes at a high rate of speed, and adapted for mounting on the propeller shaft or hub without substantially increasing the overhang or loading thereof.

Another object of the invention is to provide a pitch changing mechanism of a unitary independent construction, and in which the various load carrying components are unitary and readily accessible for inspection.

A particular object of the invention is to provide a novel form of worm drive arrangement and supporting bearings therefor.

Further objects of the invention are to provide in a pitch changing system a rugged mechanism for transmitting the power instantly from the propeller shaft to the blades, and for automatically controlling and limiting the operation of the system in a highly desirable manner.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had to the appended claims.

In the drawings, wherein like reference characters indicate like parts:

Fig. 5 is a perspective schematic view partly broken away, showing principal components of the propeller and pitch changing assembly.

Figure 1:
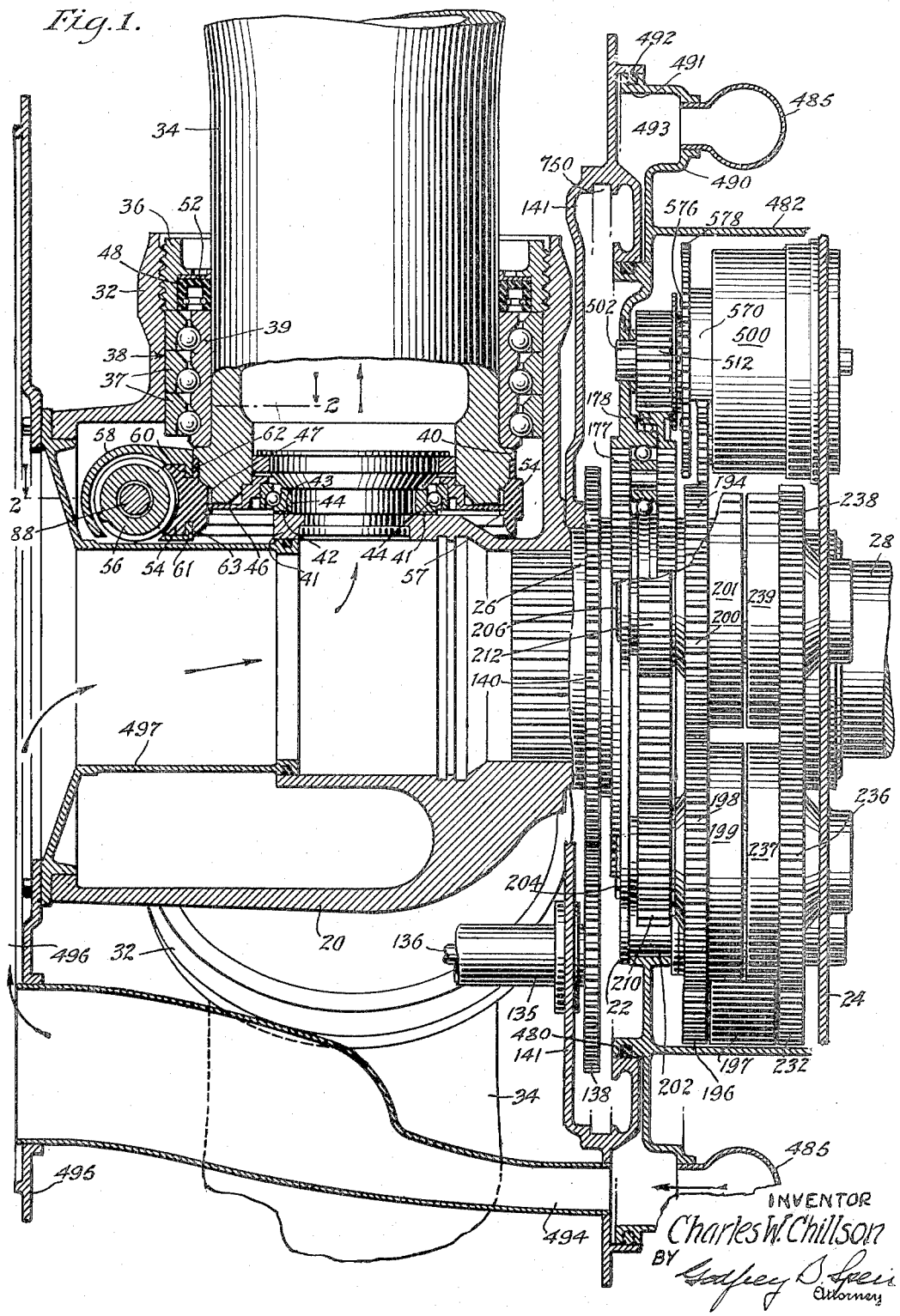
Fig. 1 is a plan view of the propeller and pitch changing assembly looking downwardly at an inclined angle, certain of the parts being cut away and shown in section.

A reference to Figs. 1 and 5 will disclose the general arrangement of a preferred form of the invention and serve to correlate the various parts hereinafter described in more detail. Therein appears a propeller hub 20, having a plurality of blade sockets 32 for swivelly receiving the shanks 34 of the propeller blades. The hub is provided with an integral sleeve 26 extending to the rear, within which is splined a drive shaft 28. Disposed around the sleeve are high and low speed gear trains composed of gears 196, 198 and 200, and gears 232, 236 and 238, respectively, arranged on spindles 202, 204 and 206, supported between stationary plate 22 and a rear housing wall 24. The gear 196 of the high speed gear train 196, 198 and 200 is geared directly to a power driven gear 194 keyed to the hub, and gears 198 and 200 are thus power driven in reverse directions. The gear 232 of the low speed gear train is driven from the gear 196 through a planetary speed reducer 197, and drives gears 236 and 238 reversely with respect to each other at a relatively slow speed. Through selective operation of any one of four hydraulic clutches 199, 201, 237 and 239 associated with each of the gears 198, 200, 236 and 238, one or the other of gears 210 or 212 is caused to drive in either direction the externally and internally toothed control ring gear 178 of an intergearing 177 at a high or low rate of speed. Movement of the control gear is transmitted through the planetary intergearing to a hub carried gear 140, which may be advanced or retarded at high or low speed relative to the hub to vary the blade pitch, transmission to each blade being individually effected through means including gears 138, driving, through shafts 136 and 88, a worm 56 and a worm wheel sector 54 carried by each blade shank. The pitch may be fixed, by holding ring gear 178 by means of a combination hydraulic and centrifugal brake 500 connected to gear 512. Feathering or unfeathering, when propeller rotation is at low speed or stopped, is accomplished through an auxiliary motor 580 acting through a gear 578.

Referring more particularly to the hub (with which this divisional application is primarily concerned), each of the blade sockets 32 is provided with a threaded blade retention nut 36 against which the outer race members 37 of the thrust bearing 38 bear. The inner race member 39 of the thrust bearing engages a shoulder or flange 40 upon the shank 34. Within the base of each socket is arranged, upon a hub sleeve extension 41, a thrust bearing support 42 having slidingly mounted thereon a pad 43, a thrust bearing 44 carrying a preloading annular spring disc 46 adapted to resiliently urge the end of each of the blade shanks 34 outwardly during non-rotation of the hub. Any suitable packing such as 48 may be provided in conjunction with each of the retaining rings 36 to confine the lubricant in the thrust bearings 38. The inner race member 39 of the thrust bearing and retaining ring 52 may be split to facilitate mounting on the shank.

Each of the propeller blade sockets has associated therewith a pitch changing transmission employing bevel gears and a worm and worm wheel drive, driven from the individual gears 138 enmeshed with the relatively rotatable hub carried gear 140. Each blade shank 34 has splined thereon adjacent the end flange 40, a ring carrying a sector worm wheel 54 meshing with an hourglass worm 56. The worm wheel is held in position on the blade, at the splines 47 by the edge of the spring ring 46 which bears on the ends of the splines 47 on the worm wheel ring interior. The worm ring is secured on the spring ring by a lock ring 57.

To maintain proper tangential alignment of the worm 56 with respect to the worm wheel, regardless of blade alignment due to blade stresses, the worm is journalled on bearings 64, 66 and 70 within a shoe 58, having arcuate flanges 60 and 61 adapted to ride within annular grooves 62 and 63 on opposite faces of the worm wheel.

Figure 2:
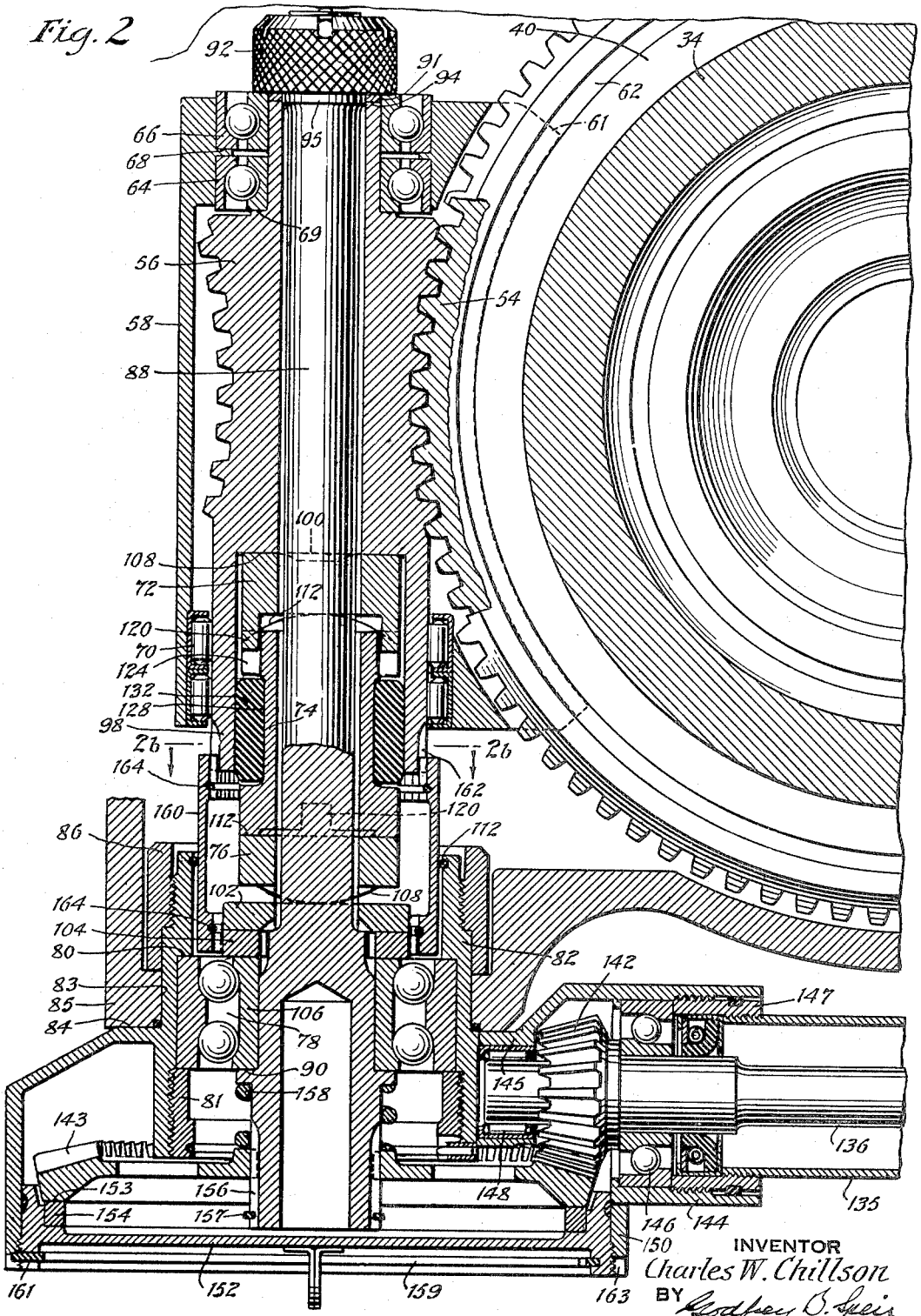
Fig. 2 is a section taken substantially on the line 2—2 of Fig. 1.

The bearings 64 and 66 (see Fig. 2) bear oppositely upon an intervening shoulder 68 located internally within one end of the shoe 58, and positively locate the worm axially with respect to the shoe in one direction through the bearing 64 and shoulder 69, and in the other direction through bearing 66, tension in the spindle 88, and a series of thrust blocks 72, 74 and 76 threaded therearound and reacting upon the opposite thrust face 100 of the worm. A ductile washer of copper or the like, 91, confined between an enlarged head 95 on the spindle 88, and the end 94 of the worm, the inner race of bearing 66 and an adjustable knurled spindle nut 92 transmits thrust to the worm, while the nut bears directly upon the bearing 66.

Figure 3:
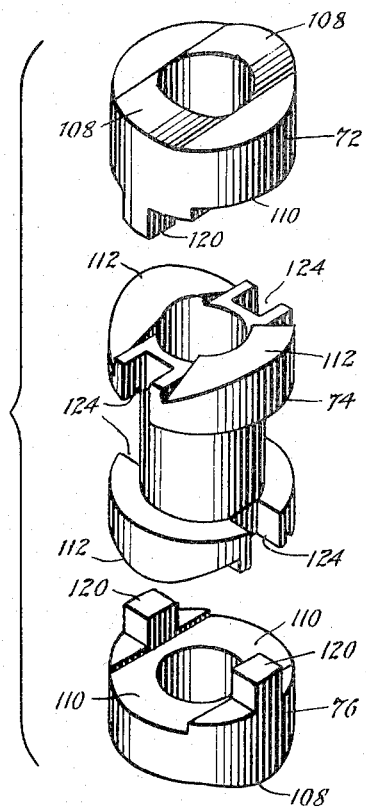
Fig. 3 is a detailed perspective view of thrust elements shown in Fig. 2.
Figure 4:
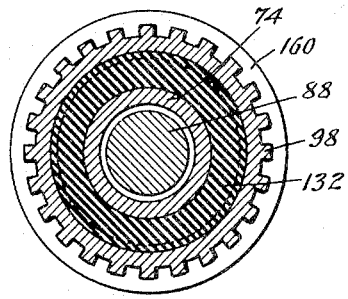
Fig. 4 is a section taken on the line 4—4 of Fig. 2.

The thrust blocks loosely surround the spindle 88, and provide universal movement between the worm thrust face 100 and the annular thrust plate 102. As shown in Fig. 3, block 72 is provided on one end with arcuate cylindrical faces 108 adapted to rock upon the end face 10. The opposite end is provided with plane faces 110 adapted to engage arcuate faces 112 on one end of the block 74, as well as lugs 120 adapted to cooperate with lug recesses 124 on block 74. The opposite ends of block 74 are similar but rotated 90° to provide rocking motion in perpendicular planes, and the blocks 76 and 72 are identical, but maintained angularly displaced by 90° by the lugs 120 and recesses 124, the block 76 rocking upon the plate 102. The reduced central portion 128 of block 74 is provided with an annular resilient rubber-like member 132 compressed around the block and within the sleeve extension 98 of the worm to afford resilient centralization of the blocks.

In order to drive each of the worms from the relatively rotatable hub carried gear 140, and each of the gears 138, a bevel gear 143 and pinion 142, the latter driven by the gear 138 and the former splined on the spindle 88, are provided. The pinion and its shaft 136 are journalled on either side of the pinion within a tubular housing member 144 having a reduced end portion 145 integrally secured to the bearing and gear housing 82, the parts being secured by copper brazing or other suitable means. The reduced portion 145 encloses a roller bearing 148 in advance of the pinion 142, and an anti-friction bearing 146 is positioned behind the pinion and held in place within the housing by an internal sleeve nut 147. The shaft 136 extends to a splined connection 137 with the gear 138, within a tubular housing 135 extending from the sleeve nut 147 to a hub mounted gear housing bulkhead 141 (Fig. 1) in which the gear 138 is journalled.

The bevel gear 143 is loosely splined upon the splined end 156 of spindle 88 to afford limited universal movement with respect thereto, and a peripheral face 153 of the gear bears against a ring bearing face 154 carried by the cover plate 152 threaded within the end 150 of the gear housing sleeve 82. A coil spring 158 bearing against shoulder 90 and gear 143 maintains the bevel gear against the cover plate bearing race 154, and overcomes any separating couple produced between the gears 142 and 143. The cover plate 152 may be removed to permit indexing of the gear 143 with respect to gear 142, in which case the spring 158 unmeshes the gear, moving it outward into engagement with split ring 157. The cover may be locked in any adjusted position by a spring ring 159 having a lug 161 adapted to protrude into any one of a number of slots 163.

The gear 143 drives the worm 56 through the spindle 88, splined ring 104, and an universally movable internally splined sleeve 160 confined by split rings 164 between its splined engagement with the ring 104, and splines 162 on the exterior end portion of the worm end sleeve 98. Through the resiliency of the spindle 88, and the flexibility of the blocks, the worm is allowed to float with the blade in response to movements under stress of the blade.

Other mechanism shown in the drawings is not relevent to the invention claimed herein. A full explanation of such other mechanism is contained in the original application which became Patent No. 2,640,552 on June 2, 1953.

Though one embodiment of the invention is shown it is to be understood that the invention may be applied in various forms and in various environments. Changes may be made in the arrangements shown without departing from the spirit of the invention. Reference should be had to the appended claims for definition of the limits of the invention.

What is claimed is:

1. In a worm drive mechanism, a support, a shaft swivelly mounted on said support, a worm wheel carried by said shaft, an annular track on each side of said wheel, a worm for said wheel, a housing and journal for said worm, means on each side of said housing for engaging said tracks to maintain said worm in proper meshing relationship with said wheel, said means being coextensive in length with said housing, means carried by said support for absorbing the axial thrust of said worm, and flexible drive means for said worm including a member journalled in said support.

2. In a worm drive mechanism, a worm wheel journalled for rotation and having circumferential bearing tracks near its periphery on both sides thereof, said tracks facing toward the worm wheel axis, a worm engaging said wheel, bearings for said worm having housing elements bridging the worm wheel periphery and engaged with both said bearing tracks, and a flexible driving connection to said worm, said driving connection including thrust absorbing means to absorb the wheel driving thrust of said worm.

3. In a worm drive mechanism, a support, a shaft swivelly mounted on said support, a worm wheel segment carried by said shaft, said worm wheel segment having grooves on each side thereof and forming bearing tracks facing toward the segment center, said tracks comprising circular arcs substantially coextensive circumferentially with worm wheel teeth, a worm housing of substantially tubular cross-section including end bearings and a central portion open on one side, a worm within said housing journalled in said end bearings having its worm thread projecting through said open portion for engagement with the teeth of the worm wheel, integral projections on said housing overlapping the side faces of said worm wheel, and segmental shoes extending inwardly from and formed integrally with said projections engaging said worm wheel tracks on both sides thereof, to hold the worm in meshing engagement with the worm wheel, said projections and said segmental shoes extending lengthwise of said housing to embrace the overall distance from one housing bearing to the other to provide direct support for said housing bearings relative to said worm wheel, and universal joint means connected to said worm for driving it.

References Cited in the file of this patent

UNITED STATES PATENTS

| | | |
|---|---|---|
| 1,072,282 | Waninger | Sept. 2, 1913 |
| 2,109,033 | Ransome | Feb. 22, 1938 |
| 2,388,863 | Noble | Nov. 13, 1945 |